United States Patent [19]

Bonyhard

[11] 3,789,373

[45] Jan. 29, 1974

[54] MAGNETIC, SINGLE WALL DOMAIN, OR LOGIC USING CHEVRON DOMAIN PROPAGATING ELEMENTS

[75] Inventor: Peter Istvan Bonyhard, Edison, N.J.

[73] Assignee: Bell Telephone Laboratories, Incorporated, Murray Hill, N.J.

[22] Filed: Nov. 6, 1972

[21] Appl. No.: 304,049

[52] U.S. Cl. 340/174 TF, 340/174 EB, 340/174 SR

[51] Int. Cl. ........................ G11c 11/14, G11c 19/00

[58] Field of Search .............................. 340/174 TF

[56] References Cited

UNITED STATES PATENTS 3,723,716 3/1973 Bobeck et al. ................ 340/174 TF

*Primary Examiner*—James W. Moffitt

*Attorney, Agent, or Firm*—C. S. Phelan

[57] ABSTRACT

Magnetic single wall domain expanders in adjacent domain propagation channels are edge-merged into a common detector stage so that a domain from any of the channels is electrically detectable at that stage. A domain compressor provides magnetic output. The channels in one embodiment are control-memory-gated outputs from different stages of a shift register that is operable in a time slot interchanging mode.

8 Claims, 1 Drawing Figure

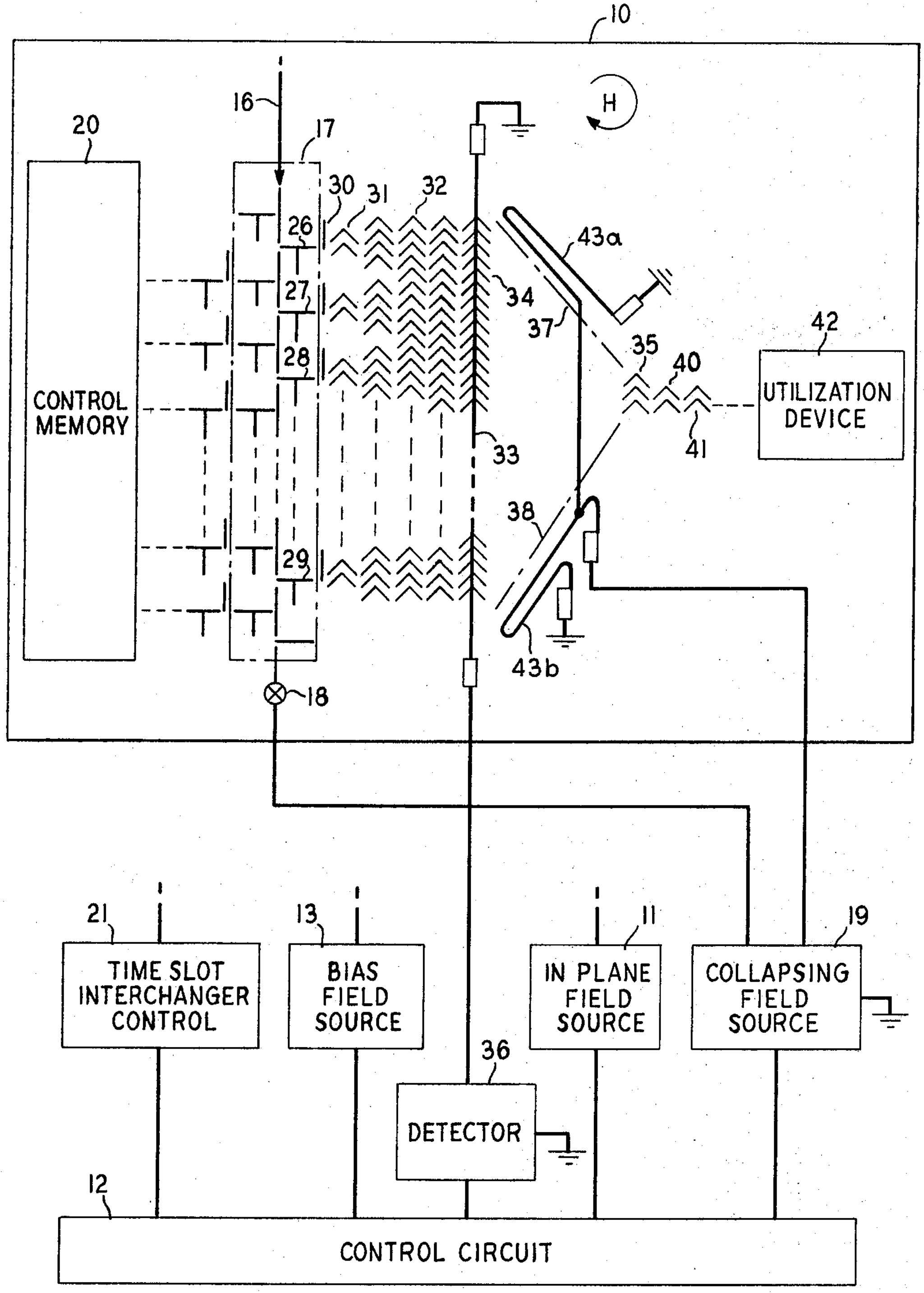
10
H
16
17
20
CONTROL MEMORY
26
27
28
29
30
31
32
33
34
35
36
37
38
40
41
42
43a
43b
UTILIZATION DEVICE
18
21
TIME SLOT INTERCHANGER CONTROL
13
BIAS FIELD SOURCE
11
IN PLANE FIELD SOURCE
19
COLLAPSING FIELD SOURCE
DETECTOR
12
CONTROL CIRCUIT

MAGNETIC, SINGLE WALL DOMAIN, OR LOGIC USING CHEVRON DOMAIN PROPAGATING ELEMENTS

BACKGROUND OF THE INVENTION

1. Field of the Invention

This invention relates to magnetic single wall domain logic systems; and it relates, in particular, to OR logic which is useful in such systems.

2. Description of the Prior Art

It is known in the art that plural magnetic single wall domain propagation channels can be directed into different points along a common collector propagation channel. However, the output resulting from such an arrangement includes signals in different time slot positions depending upon the input channel from which they were derived; thus the combination does not truly comprise an OR logic arrangement. A common electrical output could perhaps provide ORed outputs for the domain propagation channels, but it involves the difficulty of arranging a plurality of discrete detecting transducers for accomplishing the conversion from the magnetic to the electrical format. A plurality of such transducers in tandem usually do not provide an advantageous output signal-to-noise ratio. Individual channel amplifiers can improve the noise situation but they become quite costly. Also, the discrete transducers require substantial area on the substrate in which domains are moved. For example, the domain expander which is taught in the copending application, Ser. No. 201,755, filed Nov. 24, 1971, for A. H. Bobeck, F. J. Ciak, and W. Strauss, which is assigned to the same assignee as the present application, and is now U.S. Pat. No. 3,702,995, is useful for expanding magnetic domains to facilitate detection thereof at an electrically operated detection stage; but the provision of a number of such expander-detectors for plural channels requires the dedication of substantial magnetic substrate area to this function.

It is also known in the art to perform OR logic in magnetic single wall domain systems by a technique that cannot readily accommodate more than a few input channels. In such a technique, a domain is fed from one input channel to an enlarged magnetic overlay element which is common to a plurality of channels on a substrate in which magnetic domains can be moved. An example of the latter technique is taught in the U.S. Pat. No. 3,619,636 of W. F. Chow. This type of arrangement can accommodate only a relatively small number of input signal channels because of the common overlay size limitations in relation to operating speed. Thus, a logic tree made up of such modules is required if there is a need to handle a large number of input channels. It is perhaps as a result of such considerations that proposals for magnetic single wall domain time slot interchangers have generally utilized a pair of shift registers which are shifted in opposite directions and which cause the interchanger to suffer a so-called half-word problem. An example of a domain interchanger and a discussion of the half-word problem are found in the copending R. S. Krupp and L. A. Tomko application Ser. No. 204,143, filed Dec. 2, 1971, and assigned to the same assignee as the present application. The lack of suitable magnetic OR logic capable of accommodating a large number of input channels forced a different solution for achieving the time slot interchanger, or pulse shifter, result that is produced with discrete component electronics as taught, for example, in the H. Inose and T. Saito U. S. Pat. No. 3,461,242.

SUMMARY OF THE INVENTION

The burden of the foregoing aspects of magnetic single wall domain OR logic is reduced in an illustrative embodiment of the invention wherein plural magnetic single wall domain propagation channels are coupled to a common, chevron-type propagation stage from which either an electrical or a magnetic OR logic output is derived.

In one embodiment the coupling is provided by domain expanders arranged to merge edgewise into one another at a stage prior to coupling to a common domain utilization stage.

It is a feature of the invention that it facilitates the performance of OR logic across relatively large numbers of input signal channels without the necessity for providing a tree of OR logic modules and thus with less signal delay.

It is another feature that operation of the invention involves equal propagation time for propagating a domain from a corresponding point in any one of plural input channels to a common output channel.

A further feature is that the merger of domain expanders allows the sharing of domain expanding capacity among a plurality of input channels so that a relatively small amount of substrate area need be dedicated to the performance of the OR logic function.

Yet another feature is that magnetic single wall domain time slot interchangers using the invention are free of the half-word problem and thus require only one output tap per time slot of a time division multiplex signal.

BRIEF DESCRIPTION OF THE DRAWING

A more complete understanding of the invention and the various features, objects, and advantages thereof may be obtained from a consideration of the following detailed description in connection with the appended claims and the single FIGURE of the Drawing which depicts a time slot interchanger utilizing the invention.

DETAILED DESCRIPTION

In the Drawing, magnetic overlay elements of different known types, to be described, are deposited upon a substrate 10 of magnetic material in which magnetic single wall domains, sometimes called bubbles, can be moved. The present invention is illustratively depicted in terms of a field-access type of arrangement wherein a rotating magnetic field, i.e., a field which reorients periodically in the plane of the substrate 10, as indicated by the clockwise arrow H in the Drawing, is provided by an in-plane field source 11 which is operated by a common control circuit 12 in a manner which is now well known in the art. Domain size in the substrate 10 is stabilized by a magnetic field provided by a bias field source 13 under the control of the control circuit 12. The rotating magnetic field cooperates with magnetic overlay elements deposited on the substrate 10 to produce magnetic field concentrations in the substrate for attracting or repelling domains and thereby causing domain propagation through the substrate along paths or channels, beneath the overlay elements.

Signals are provided from a source, schematically represented by an arrow 16 in the Drawing, to a T-bar shift register 17 which is of a well-known type and corresponds, for example, to the time slot interchanger input shift register in my copending application Ser. No. 214,269, filed on Dec. 30, 1971, assigned to the same assignee as the present application, and now U.S. Pat. No. 3,751,597. These signals are in the form of magnetic single wall domains and, advantageously, represent time division multiplexed, pulse coded, signal trains. Domains in the shift register 17 are propagated downward, as shown in the Drawing, as the inplane field rotates. Ultimately, domains reach a domain annihilator 18, which in the Drawing is operated by an electric signal from a collapsing field source 19, which is also controlled by the control circuit 12. Any convenient technique for eliminating unwanted domains can, of course, be employed instead of annihilator 18.

Plural T-bar domain propagation paths couple the left-hand side of the shift reigster 17 to receive domains representing time slot interchanger control signals from a plurality of control memory storage loops of a control memory 20, as set forth in my aforementioned application. The control memory contains control signals which are stored and erased at appropriate times by means of signals provided from a time slot interchanger control 21, also controlled by the circuit 12, as described in my aforementioned application. A control domain which is propagating in a control path from control memory 20 toward the shift register 17 interacts with a signal domain propagating downward therein upon reaching the shift register. That interaction causes the signal domain to be displaced out of the shift register to the right while the control domain enters the register and is propagated downward to the annihilator 18. The register 17 includes a plurality of outputs, each of which is controlled by signals in a different one of the paths from memory 20. Register outputs are schematically represented by the T-shaped overlay elements such as the four illustrative elements 26, 27, 28, and 29; and these elements constitute inputs for a plurality of domain propagation channels extending to the right from the shift register 17.

As the in-plane rotating field passes through its different resultant field orientations in a clockwise direction, a domain in any channel moves from its T element, e.g., element 26, to a vertical bar element, such as the element 30, when the resultant in-plane field is directed downward. Further field rotation to a condition in which the resultant field is directed from right to left causes the domain to shift from the element 30 into a portion of the propagation path which is formed of a sequence of patterns of chevron overlay elements. In the chevron portion of the path, each stage is made up of a plurality of chevron elements, such as the pair of elements in the upper channel of the first chevron stage 31. Each stage chevron pattern extends transversely to the direction of domain propagation. These patterns in successive stages of each channel include increasing numbers of chevron elements. Chevron elements of such patterns are of a size and spacing to constitute patterns of fine-grained elements for providing domain expansion, as taught in the aforementioned Bobeck et al., application Ser. No. 201,755.

Ultimately, the chevron patterns of corresponding stages in different ones of the propagation channels to the right of register 17 merge with one another at the edges of the channels, as occurs at the third chevron stage 32 in the Drawing. A sufficient number of additional expanding stages are advantageously provided so that an extended domain becomes large enough to provide an output electric signal at a stage 34 for applications of the invention in which magneto-resistive detection is employed. Such detection is provided in the illustrative embodiment by means of a magneto-restrictive electric circuit element 33 extending vertically across, and interconnecting, apices of chevron elements of the stage. The element 33 is connected to a detector 36 which is operated under the control of circuit 12. This type of detection is taught in the aforementioned A. H. Bobeck et al., application Ser. No. 201,755.

It is unnecessary to include a sufficient number of domain expansion stages in each of the propagation channels to produce a domain which is sufficiently large to be electrically detectable. The reason is that after channels have been edge-merged they share the expansion capability of elements in corresponding stages. Thus, a plurality of merged stages, such as the stage 32, are advantageously employed in sequence in order to extend a domain sufficiently to be detectable with a desired signal-to-noise ratio. In a time slot interchanger, control 21 normally affects control memory 20 so that only a single domain is derived from register 17 at any one time. However, simultaneous domains may occur in some OR logic applications in corresponding stages of the discrete propagation channels which feed domains to a common merged stage. Whether or not such domains merge with one another, they cooperate in a common detector stage to produce the inclusive OR type of output signal.

Circuit element 33 provides an electrical output for the illustrated expander OR logic. Although electrical domain detection is useful in some systems, it is advantageous in others to utilize signals in the magnetic format. Under the latter circumstances, an OR logic output is provided in magnetic form by coupling the final common merged stage 34 through a multistage domain compressor, as schematically represented by the converging broken lines 37 and 38 which converge into a three-element chevron stage 35 as taught in the aforementioned A. H. Bobeck et al., application Ser. No. 201,755. Domains continue propagation to the right through stages 40 and 41 to a utilization device 42. Thus, a domain is propagated from any one of the OR logic input channels, which receives domains from outputs of shift register 17, to a single output channel that drives the utilization device 42. Likewise, plural domains which appear simultaneously at the detection stage 34 are propagated to the right through the domain compressing stages until such time as the natural repulsion between the domains forces one of them out of the compressing chevron pattern while the other continues on to the utilization device 42. The eliminated domain is then advantageously collapsed by a collapsing signal in a circuit 43 extending along the sides of the domain compressing region so that it is unable to interfere with other domain propagation arrangements on the substrate 10.

It can now be appreciated by those skilled in the art that if a domain compressor is employed, the OR logic input channels can be further simplified. Thus, it is necessary only that the outputs of shift register 17 couple directly into an individual part of a common chevron element stage; and intervening stages between stages 31 and 34 can be eliminated. The domain compressing stages following stage 34 then operate simply to steer domains from any point in stage 34 to the common output stage 40.

Although the present invention has been described in connection with a particular embodiment thereof, it is to be understood that additional embodiments, applications, and modifications which will be apparent to those skilled in the art are included within the spirit and scope of the invention.

What is claimed is:

1. In combination, means for propagating magnetic single wall domains in separate propagation channels in a substrate of material in which domains can be moved, a first stage chevron pattern of magnetic overlay elements on said substrate, said pattern extending across said channels, and a domain compressor comprising a plurality of additional stages of chevron patterns of magnetic overlay elements on said substrate, said additional patterns being in domain-coupling proximity to one another in a tandem sequence and including in consecutive ones of the patterns in said sequence consecutively decreasing numbers of elements, the largest one of said additional patterns being located in domain-coupling proximity to substantially the full length of said first pattern whereby a domain in any of said channels is coupled to the smallest of said additional chevron patterns.

2. In combination, means for propagating magnetic single wall domains in separate propagation channels, said propagating means comprising chevron pattern forming successive stages of magnetic overlay elements on a substrate of material in which magnetic single wall domains can be moved, a predetermined output signal channel, and means, responsive on an inclusive OR logic basis to magnetic domain signals on said separate channels, for producing an inclusive OR signal on said output channel, said producing means including a chevron element pattern extending across all of said separate channels.

3. The combination in accordance with claim 2 in which said propagating means comprises an input domain propagating channel of plural stages, means, at different ones of said input channel stages, for selectively coupling a domain output from such stages to corresponding ones of said separate channels, and means for activating said selective coupling means to secure a predetermined ordering in said single channel of domains from said input propagating channel.

4. The combination in accordance with claim 3 in which said selective coupling means comprises means for limiting the number of domains coupled from said input propagation channel so that only one domain can be present in all of said separate channels at any one stage level thereof.

5. The combination in accordance with claim 2 in which each of said separate channels includes chevron pattern extensions of increasing lateral length in successive ones of said stages whereby channel joining occurs after a plurality of stages of said chevron patterns and prior to said producing means.

6. The combination in accordance with claim 5 in which said producing means comprises electric circuit means coupled to said pattern extending across all of said channels and, means for operating said electric circuit means to detect the presence of a domain at the last mentioned stage.

7. The combination in accordance with claim 2 in which said producing means comprises means for compressing magnetic domains and including a sequence of chevron patterns of decreasing transverse dimension, the last mentioned patterns each comprising a plurality of chevron magnetic elements over-layed upon said substrate, the first pattern in the last mentioned sequence being coupled to said pattern extending across all of said chennels, and means, coupled to the last pattern of the last mentioned sequence, for responding to a magnetic single wall domain at that stage.

8. The combination in accordance with claim 7 in which said domain compressing means further comprises means, adjacent to edges of said sequence of chevron patterns, for eliminating domains propagating laterally out of said sequence.

* * * * *